O. P. M. DAVIS.
KINETOSCOPE.
APPLICATION FILED JAN. 20, 1910.
1,036,462.
Patented Aug. 20, 1912.
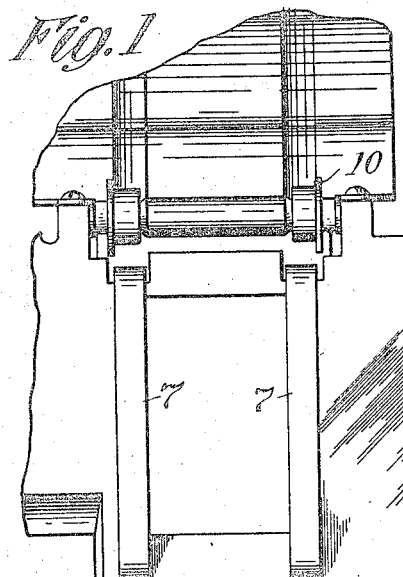
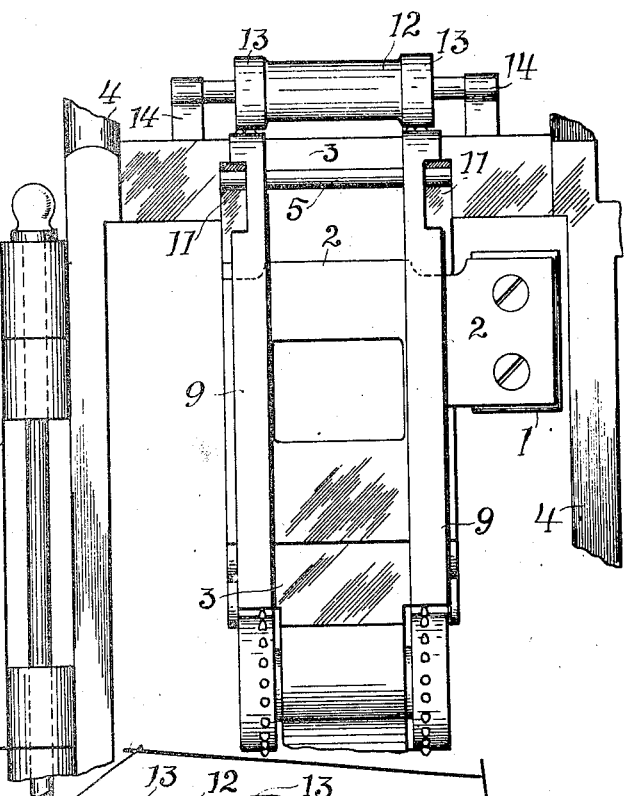
Fig. 1.
Fig. 2.
Fig. 2.
Witnesses:
Robert Sutphen.
Warren H. Small.
Inventor:
Oliver P. M. Davis
by Frank L. ——
his Atty.

UNITED STATES PATENT OFFICE.

OLIVER P. M. DAVIS, OF BEDFORD, INDIANA, ASSIGNOR, BY MESNE ASSIGNMENTS, TO THOMAS A. EDISON, INCORPORATED, OF WEST ORANGE, NEW JERSEY, A CORPORATION OF NEW JERSEY.

KINETOSCOPE.

1,036,462.

Specification of Letters Patent. Patented Aug. 20, 1912.

Application filed January 20, 1910. Serial No. 539,019.

*To all whom it may concern:*

Be it known that I, OLIVER P. M. DAVIS, a citizen of the United States, and a resident of Bedford, county of Lawrence, and State of Indiana, have invented certain new and useful Improvements in Kinetoscopes, of which the following is a description.

This invention relates to kinetoscopes and comprises a device designed to prevent the wear and uneven pressure upon the film, which is incident to the operation of kinetoscopes now in use.

Although shown as applied to a kinetoscope of the Edison type, my invention is equally applicable to all types of kinetoscopes, and is shown in its present relation for purposes of illustration merely, and is not intended to be limited thereto.

As is well known to those familiar with the art, the main frame of the kinetoscope fixedly supports the objective glass and the aperture plate so that the opening in the latter is in line with the objective glass. The framing device, comprising an auxiliary frame and a film gate, supports the film and is adapted to be raised and lowered in order to center the picture on the film directly behind the opening in the aperture plate, and thereby in line with the objective glass.

Previous to my invention, the film was pressed directly against the aperture plate by the usual film tension springs mounted on the film gate, so that upon raising or lowering the framing device to frame the picture, the film was dragged against the said aperture plate. This scratched and wore the film and often deranged it, thereby forming kinks in the film and preventing the proper working of the machine.

The object of my invention is to prevent this objectionable wear and derangement by attaching guides to a suitable portion of the framing device between the aperture plate and the film, in such a manner that the film is pressed by the film tension springs against said guides instead of against the stationary aperture plate as heretofore. The guides move with the framing device, and the film being held firmly between the film tension springs and said guides, is raised or lowered without rubbing or wear.

A further object of my invention is to mount said guides on a removable portion of the framing device, so that my improvements can be readily applied to old as well as to new kinetoscopes, and if desired, this removable portion with the guides attached, sold complete as an article of manufacture.

A further object of my invention is to provide an additional guiding device, shown in the present embodiment of my invention as a spring mounted roller, to guide the film directly to the aforementioned guides.

One arrangement of my improvements which has been used successfully on kinetoscopes in actual operation is illustrated in the accompanying drawings, wherein—

Figure 1 is an elevation of a detail of the rear of a kinetoscope with the film gate open; and Fig. 2 is a vertical section taken through the opening of the aperture plate with the film gate closed.

Similar reference numerals refer to similar parts throughout the drawings.

In the drawings 1 represents that portion of the main frame which supports the aperture plate 2 with the opening of the latter in line with the objective glass (not shown) which, likewise, is mounted on the main frame. As is usual in kinetoscopes of this type, the removable film guard 3 is held in the auxiliary frame 4 by a pin 5 which extends through an opening 6 in the film guard and through alined openings (not shown) in the framing device. The film guard is directly in front of and in contact with the aperture plate 2, which latter forms a guide for the film guard during the framing of the picture.

In kinetoscopes heretofore in use, the film was at the rear of and in contact with both the aperture plate 2 and the film guard 3, being held against the same by the usual film tension springs 7 on the film gate 8 when the latter was closed and the machine ready for operation. When the framing device was raised or lowered to frame the picture, the film necessarily was rubbed and dragged over the surface of the aperture plate 2, the upper or lower edges (as the case might be) frequently scratching the film and deranging it. The pressure of the film tension springs 7 on the film also varied according to the different positions of the framing device. When the latter was in an intermediate position, the center of the springs pressed the film against the aperture plate, but when the framing device was in an upper or lower position (as the case might be) only the upper or lower part of the springs pressed the film against the aperture plate. As it is not possible to make said springs so that they shall press equally throughout their length, it will be evident that the film was held with an uneven pressure according to the position of the framing device, which prevented that uniform movement of the film which is so necessary to the successful reproduction of the picture.

It was found that the above difficulties could be overcome if guides were mounted on a suitable part of the framing device between the aperture plate and the film, and in the present embodiment of my invention herein disclosed, the guides 9 are mounted upon the film guard 3 and spaced apart therefrom, so that the aperture plate 2 extends between said guides and said film guard. When the film gate 8 is closed and the machine ready for operation, the film will be held firmly and evenly between the film F, tension spring 7 and the guides 9, and as the latter are secured to and form a part of the framing device, the film is raised and lowered to frame the picture without contact with the aperture plate or any other fixed portion of the kinetoscope. The full length of the film tension springs 7 is always in contact with the guides 9 when the door is closed, irrespective of the position of the framing device, and the film is held, therefore, with a uniformly even tension. Said guides 9 may be attached to the film guard 3 in any convenient manner, the present embodiment showing them secured at the top and the bottom of said film guard.

To guide the film properly, the usual flanged wheel 10 is mounted on the film gate and the usual recesses 11 are provided in the film guard 3 for said flanges. To insure the smooth running of the film onto the guides, an additional guide wheel 12 having bearing portions 13 in line with the guides 9 is mounted by means of spring arms 14 upon the film guard and so arranged that when the film is being drawn through the machine said wheel 12 will be pressed forward against the action of its spring arms 14 so that the point of contact of the bearing portions 13 of said wheel shall lie approximately in a plane with the guides 9. The removable film guard 3 provided with the guides 9 and with the spring mounted roller 12 can be assembled as a complete article of manufacture and sold ready to be substituted for the film guards at present used in kinetoscopes of this type. It is also comparatively easy and inexpensive to remove an old film guard from a kinetoscope and supply it with my improvements.

Many modifications will be apparent to those skilled in the art, my invention not being limited to any particular combination, but consisting broadly of means mounted to move with the framing device and adapted to contact with the film to relieve it from rubbing and uneven pressure due to incidents of framing.

Having thus disclosed one embodiment of my invention, what I claim and desire to protect by Letters Patent is:

1. As an article of manufacture, a film guard provided with guides spaced apart therefrom and adapted to receive an aperture plate between said guard and said guides, and a roller mounted on said guard and adapted to guide the film onto the said guides, substantially as described.

2. In a kinetoscope, the combination with the main frame carrying a stationary aperture plate and the auxiliary frame movable relative to the main frame for framing the picture, of a film guard attached to the auxiliary frame and guided by the aperture plate, substantially as set forth.

3. An attachment for a kinetoscope having an aperture plate, comprising a film guard provided with guides spaced apart therefrom and adapted to be guided by the aperture plate by receiving the latter between said guard and said guides, substantially as set forth.

4. In a kinetoscope, the combination with the main frame carrying a stationary aperture plate and the auxiliary frame movable with respect to the main frame for framing the picture, of a film guard pivotally connected at one end to the auxiliary frame and provided with means whereby it is guided by the aperture plate upon movement of the auxiliary frame, substantially as set forth.

5. An attachment for a kinetoscope having an aperture plate, comprising means whereby it is adapted to be pivotally mounted at one end on the kinetoscope, guides, and means spaced from said guides, whereby the aperture plate is adapted to be received between said guides and last mentioned means and the attachment to be guided by said aperture plate, substantially as set forth.

6. An attachment for a kinetoscope having an aperture plate, comprising means whereby it is adapted to be pivotally mounted upon the kinetoscope, guides and means spaced therefrom adapted to receive the aperture plate therebetween, and a roller adapted to guide the film onto the said guides, substantially as set forth.

This specification signed and witnessed this 17 day of Jan. 1910.

OLIVER P. M. DAVIS.

Witnesses:
JAMES M. DAVIS,
LUCIEN E. PAYNE.

Corrections in Letters Patent No. 1,036,462.

It is hereby certified that in Letters Patent No. 1,036,462, granted August 20, 1912, upon the application of Oliver P. M. Davis, of Bedford, Indiana, for an improvement in "Kinetoscopes," errors appear in the printed specification requiring correction as follows: Page 2, line 19, after the word "film," insert the reference-letter *F;* same page, line 21, after the word "film," strike out the reference-letter and comma " F,"; same page and line, for the word "spring" read *springs;* and that the said Letters Patent should be read with these corrections therein that the same may conform to the record of the case in the Patent Office.

Signed and sealed this 8th day of October, A. D., 1912.

[SEAL.]

C. C. BILLINGS,
*Acting Commissioner of Patents.*